July 18, 1950

S. F. VARIAN

HIGH-FREQUENCY TUBE STRUCTURE
WITH FREQUENCY CONTROL
Original Filed Nov. 25, 1943

2,515,280

INVENTOR
SIGURD F. VARIAN
BY Paul B. Hunter
ATTORNEY

Patented July 18, 1950 2,515,280

UNITED STATES PATENT OFFICE 2,515,280

HIGH-FREQUENCY TUBE STRUCTURE WITH FREQUENCY CONTROL

Sigurd F. Varian, Garden City, N. Y., assignor to The Sperry Corporation, a corporation of Delaware Original application November 25, 1943, Serial No. 511,722. Divided and this application March 2, 1945, Serial No. 580,526

6 Claims. (Cl. 315—5)

This invention relates to frequency control of hollow resonator devices and is more particularly concerned with electrothermal arrangements and methods for controlling frequency in such devices.

The present application is a division of application Serial No. 511,722, filed November 25, 1943, and patented April 26, 1949 as U. S. Patent No. 2,468,145, and a continuation-in-part of application Serial No. 435,954, filed March 24, 1942, and patented January 21, 1947 as U. S. Patent No. 2,414,496.

Electron discharge apparatus of the type wherein a beam of electrons is passed in energy exchanging relation with the electromagnetic field of a hollow resonator device are widely used, especially in ultra high frequency systems. In most of such systems, careful and reliable frequency control over the resonator circuit is important. It is known that the effective capacity and inductance of the circuit of a hollow resonator device depends mainly on the shape and/or volume of the resonator, and various arrangements and mechanisms have been heretofore suggested for variably controlling the circuit characteristics and frequency of the resonator by altering the resonator shape and/or volume.

The present invention contemplates improvements in such electrical and electromechanical frequency control of hollow resonator devices.

The major object of the invention is to provide novel electrically energized, extremely sensitive, thermally responsive apparatus and methods of frequency control for hollow resonator devices.

A further object of the invention is to provide novel frequency control arrangements for a hollow resonator device wherein a thermally responsive frequency control member such as an expansible and contractible wire operatively connected to said device is heated by electrical means.

A further object of the invention is to provide novel frequency control arrangements for hollow resonator devices wherein the temperature of a thermally responsive tuning control member is regulated by suitable electrical energization.

It is a further object of the invention to provide electron discharge hollow resonator apparatus embodying a plurality of hollow resonator devices coupled by an electron beam and having novel thermally responsive gang and/or individually actuatable frequency control arrangements for such devices.

It is a further object of the invention to provide hollow resonator means having portions relatively movable for frequency control and a non-rigid thermally responsive frequency control member operatively associated with said portions.

A further object of the invention is to provide novel frequency control apparatus for a hollow resonator device embodying a spring biased non-rigid control member operatively connected to said device.

Figure 1:
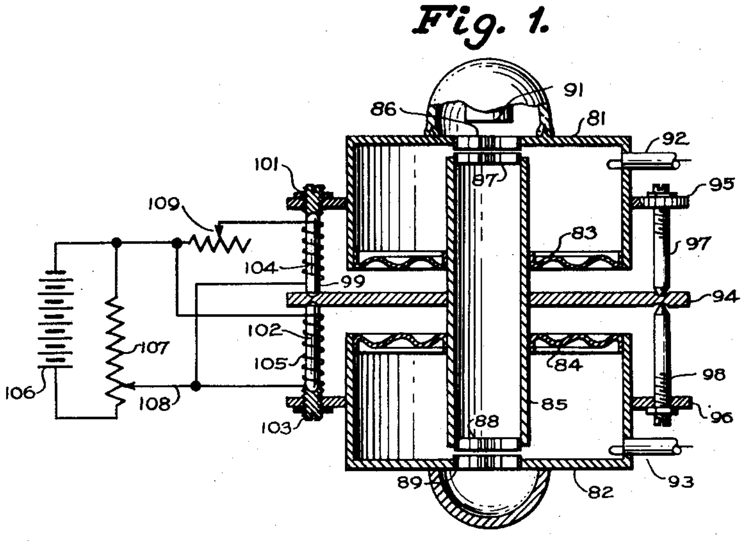
Figure 2:
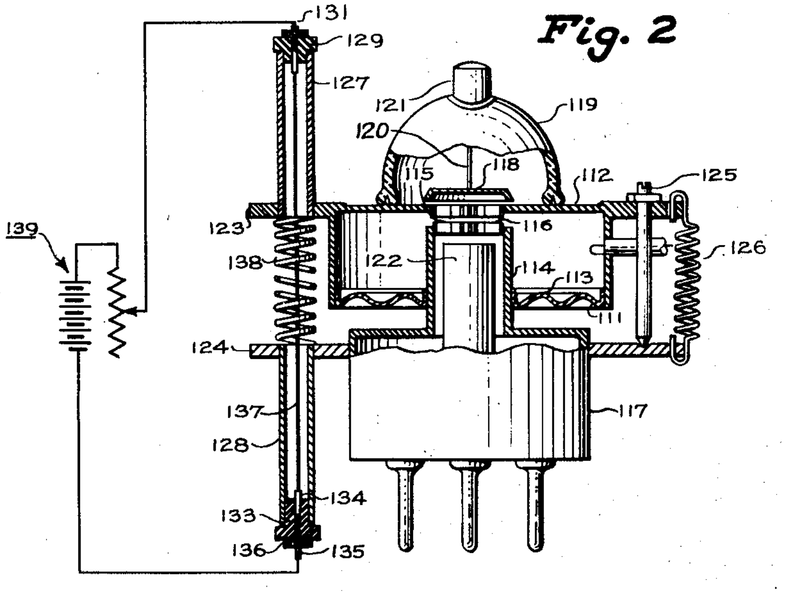

Further objects of the invention will presently appear as the description proceeds in connection with the appended claims and the annexed drawing wherein:

Figure 1 is an elevation view, partly in section, illustrating an embodiment of the invention including simultaneous and individual thermally actuated frequency control in a multiple hollow resonator device; and Fig. 2 is an elevation view, partly in section, illustrating another embodiment of the invention wherein a flexible non-rigid frequency control member is operatively connected to a hollow resonator device.

Fig. 1 illustrates a double hollow resonator device having individual thermally responsive frequency control members arranged for gang or differential tuning.

Two hollow cylindrical resonators 81 and 82 are connected by adjacent flexible walls 83 and 84 to a drift passage tube 85. Resonators 81 and 82 are preferably made of copper, with flexible walls 83, 84 comprising annularly crimped areas having sufficient resiliency to tend to return to their illustrated positions, where the general planes of the walls 83, 84 are normal to the resonator axes. Electron permeable grid pairs 86, 87 and 88, 89 are provided on opposite ends of tube 85 and the adjacent resonator walls. A suitable cathode 91 is mounted in alignment with the grids, and the usual concentric line terminals for supplying or extracting high frequency energy are provided at 92 and 93.

A heavy radial flange 94, rigid with drift tube 85, is disposed substantially equally intermediate similar parallel flanges 95 and 96, which are rigid with grids 86 and 89 respectively. A plurality of circumferentially spaced adjustable screw assemblies such as indicated at 97 and 98 are provided between the associated flanges as illustrated. Usually screw assemblies 97 and 98 are so adjusted as to produce some flexure of walls 83 and 84 so as to select a predetermined grid spacing and keep the parts tight.

One pair of the screw assemblies is thermally responsive and controllably energized as illustrated at the left of Fig. 1. A strut 99 of stainless steel, aluminum, Duralumin or the like, having high coefficient of expansion, is held between flange 94 and a short screw 101 threaded in flange 95. Similarly an aluminum or like strut 102 is held between flange 94 and a short screw 103 threaded in flange 96. Heater coils 104 and 105 of resistance wire are electrically insulatingly mounted about rods 99 and 102 respectively.

A battery 106 has a voltage-dividing resistor 107 in parallel therewith and both heater coils 104, 105 are connected across the resistor 107 so that adjustment of tap 108 similarly varies the power delivered to each coil 104, 105. The lead to coil 104 also passes through an adjustable resistor 109 by which the relative power delivered to coils 104 and 105 may be varied for trimming or differentially tuning the resonators.

Usually three 120° spaced tuning control assemblies are employed, two aligned screw assemblies 97, 98 and one aligned strut arrangement 104, 105. The small frequency control movements involved render any departures from parallelsim of the grids due to such movement immaterial. If desired moreover, all three strut assemblies may be made identical with that at 104, 105 and all connected to battery 106 and resistor 107 in the same manner. This will give accurate and exactly parallel relative displacement of the grids.

In operation, preliminary and rough frequency control adjustments are made with screw assemblies 97, 98 and screws 101 and 103. Expansion and contraction of rods 99 and 102 by controlled energization of coils 104, 105 result in corresponding displacements of grid pairs 86, 87 and 88, 89. If the inherent resiliency of walls 83 and 84 is not sufficient to keep the parts tight, tension springs (not shown) may be provided between the flanges. Simultaneous and similar frequency control of each resonator 81 and 82 can thus be obtained by adjustment of tap 108. This is electrical gang tuning. The frequency of resonator 81 may be independently varied by adjustment of resistor 109. This is a trimming adjustment to compensate for physical and/or electrical inequalities between the resonators.

I have found that, using struts 99, 102 of aluminum, an elongation is obtained of about 0.008 inch for a 300° C. rise in strut temperature. This amount of movement is ample for the usual required tuning range. If desired, struts 99 and 102 may be hollow with heater coils 104, 105 inside.

This gang tuning arrangement may be also accomplished by passing heating current directly through struts 99 and 102, the latter being suitably insulated and rigidly connected to flanges 94, 95 and 96.

In Fig. 2, a hollow resonator 111 has a rigid end wall 112 and a flexible end wall 113 centrally supporting a hollow post 114 which extends into the resonator to terminate adjacent wall 112. Suitable electron permeable grid structures 115 and 116 are provided in wall 112 and the inner end of post 114. The outer end of post 114 is secured to a conventional pronged vacuum tube base 117. On the other side of resonator 111, a shallow cup-shaped metal reflector 118 is suitably mounted within a glass or like sealing cap 119. Reflector 118 is electrically connected by wire 120 to an external terminal 121 by which a suitable potential may be applied to the reflector. A cathode 122 extends within the post 114 in alignment with the grids and reflector.

Radial flanges 123 and 124 are provided rigid with grids 115 and 116 respectively. A plurality of circumferentially spaced adjustable length screw assemblies 125 (only one shown), each biased by associated tension springs 126, are provided between flanges 123 and 124, for manual frequency control adjustments.

Flanges 123 and 124 are formed with aligned apertures in which hollow tubes 127 and 128 of Invar or some metal or alloy having a very low coefficient of thermal expansion are fixed and extend in opposite directions. The end of tube 127 is closed by a plug 129 of insulating material in which is securely imbedded a conductive rod 131, and the threaded outer end of rod 131 carries a reenforcing nut 132.

The outer end of tube 128 is closed by a suitable insulating plug 133 which is centrally apertured to slidingly receive a short conductive rod 134 having a threaded outer end 135 for mounting a knurled nut 136. A non-rigid expansible and contractible conductor 137, preferably a thin flexible tungsten strip or wire, is secured at opposite ends to rods 131 and 134. Conductor 137 may be set at predetermined tension by adjustment of nut 136. A wire is preferable because it heats up and loses heat rapidly, thereby lending itself to automatic tuning, and a tungsten wire is preferable because of its exceptional strength and toughness even at high heat. Any metal or alloy having a uniform expansion and contraction in response to heating by electrical current passing therethrough may be employed for wire 137. A suitable compression spring 138 is arranged between flanges 123 and 124 and surrounding conductor 137.

In operation, relative separation of grids 115 and 116, and hence frequency control of resonator 111 may be effected by controllably energizing conductor 137 from an adjustable power source 139. As conductor 137 is increasingly heated, it expands in length, and spring 138 is permitted to increase the spacing between grids 115, 116 to thereby increase the resonator frequency. When conductor 137 cools it contracts to produce the reverse frequency control. Springs 126 are not sufficiently strong to interfere with the above operation.

Besides permitting the use of a long wire 137 for obtaining appreciable tuning motion, tubes 127 and 128 provide protective draft shields for wire 137.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. High frequency apparatus comprising a plurality of associated hollow resonators coupled by an electron stream, a thermally responsive expansible and contractible frequency control member for each resonator, means for simultaneously controlling the temperatures of at least two of said members, and means for independently controlling the temperature of one of said two members.

2. High frequency apparatus comprising a cavity resonator having a pair of relatively movable elements for varying the resonant frequency thereof, resilient means connected between said elements for urging said elements apart, thin, flexible and longitudinally thermally expansible wire means stretched between said elements and limiting the separation thereof in response to said resilient means, said wire means comprising an electrical conductor of appreciable resistivity, and means for connecting said wire means to a source of electric current as a current conduction path for changing the temperature thereof and hence the separation of said relatively movable elements and thereby changing the resonant frequency of said cavity resonator.

3. High frequency apparatus comprising a cavity resonator having a pair of relatively movable elements for varying the resonant frequency thereof, resilient means connected between said elements for urging said elements apart, thin, flexible and longitudinally thermally expansible wire means stretched between said elements and limiting the separation thereof in response to said resilient means, said wire means comprising an electrical conductor, and means for variably electrically energizing said wire for changing the temperature thereof and hence the separation of said relatively movable elements and thereby changing the resonant frequency of said cavity resonator.

4. High frequency apparatus comprising a cavity resonator having a pair of relatively movable elements for varying the resonant frequency thereof, resilient means connected between said elements for urging said elements apart, thin, flexible and longitudinally thermally expansible wire means stretched between said elements and opposing motion thereof in response to said resilient means, and means connected to said wire means for passing variable amounts of electric current therethrough, whereby the resultant variable extension or contraction of said wire means in response to heating thereof permits said resilient means to cause corresponding changes in the separation of said elements to vary the resonant frequency of said resonator.

5. High frequency tube structure comprising a cavity resonator having adjustable means for varying the natural frequency thereof, and tuning control means operably connected to said adjustable means comprising a thin, flexible and longitudinally thermallly expansible member coupled to said adjustable means which changes in length in response to temperature variations thereof, bias means coupled to said member for exerting tension on said member and maintaining said member substantially taut during operation, and an adjustable source of electric current connected to said member and adapted to pass adjustable amounts of current therethrough whereby the natural frequency of said resonator may be correspondingly adjusted.

6. High frequency tube structure comprising a cavity resonator having a pair of relatively movable electron-permeable grids, a source of electrons on one side of said pair of grids, a reflector electrode on the other side of said pair of grids, resilient means urging said grids in a predetermined direction, a thin, flexible and longitudinally thermally expansible conductive member connected to said grids for opposing said motion, said resilient means comprising means for tensioning said non-rigid member, and a source of adjustable current connected to pass current through said non-rigid member, whereby upon adjustment of the current passing through said member, the separation of said grids and hence the resonant frequency of said resonator may be adjusted.

SIGURD F. VARIAN.

REFERENCES CITED

The following references are of record in the file of this patent:

UNITED STATES PATENTS

| Number | Name | Date |
|---|---|---|
| 1,658,953 | Theremin | Feb. 14, 1928 |
| 2,079,809 | Kuhle et al. | May 11, 1937 |
| 2,311,658 | Hansen et al. | Feb. 23, 1943 |
| 2,374,810 | Fremlin | May 1, 1945 |
| 2,408,817 | Snow | Oct. 8, 1946 |
| 2,414,785 | Harrison et al. | Jan. 21, 1947 |
| 2,438,132 | Snow | Mar. 23, 1948 |